United States Patent
An

(12) 
(10) Patent No.: US 6,226,518 B1
(45) Date of Patent: May 1, 2001

(54) CELLULAR RADIO COMMUNICATION SYSTEM HAVING BASE STATIONS CONSTRUCTED IN THE FORM OF A DAISY CHAIN AND METHOD OF CONTROLLING DATA TRANSMISSION USING THE SYSTEM

(75) Inventor: Hong Sik An, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/104,232

(22) Filed: Jun. 25, 1998

(30) Foreign Application Priority Data

Jun. 27, 1997 (KR) .................................. 97/28432

(51) Int. Cl.[7] .................. H04Q 7/20; H04B 1/38
(52) U.S. Cl. .................... 455/449; 455/446; 455/561
(58) Field of Search ..................... 455/446, 449, 455/445, 500, 561, 560, 426, 447; 370/337, 442, 522

(56) References Cited

U.S. PATENT DOCUMENTS

| | | | |
|---|---|---|---|
| 5,408,514 | * | 4/1995 | Sakamoto et al. .................. 455/436 |
| 5,442,683 | * | 8/1995 | Hoogeveen ......................... 455/432 |
| 5,613,211 | * | 3/1997 | Matsuno ............................. 455/449 |
| 5,715,245 | * | 2/1998 | Suonvieri ........................... 370/337 |

OTHER PUBLICATIONS

Zhang et al., Token Ring Arbitration Circuits for Dynamic Priority Algorithms, 1995 IEEE.*
Liang et al., A Global Memory Multiprocessor System with a Programmable interconnection Network, 1996 IEEE.*
Robertazzi, Processor Equivalence for Daisy Chain Load Sharing Processors, IEEE Transactions on Aerospace and Electronic Systems, vol. 29, No. 4, Oct. 1993.*
Alam et al., Decentralized Arbiter Design for a Synchronous Hierarchical Bus Multiprocessor System, IEEE, 1996.*

* cited by examiner

Primary Examiner—Nay Maung
Assistant Examiner—Joy Contee
(74) Attorney, Agent, or Firm—Fleshner & Kim, LLP

(57) ABSTRACT

A cellular radio communication system having base stations constructed in the form of a daisy chain and a method of controlling data transmission using the system whereby data communications with a plurality of base stations as well as data communications among the respective base stations can be performed using a single base station controller and shared transmission lines in a specified area wherein expressways or railroads are constructed. The system includes a base station controller provided in a specified region of a determined service area, and a plurality of base stations linked in series to the base station controller through trunk lines.

14 Claims, 4 Drawing Sheets

S_AST

Daisy_Ast

S_FEF

Daisy_FEF

A_READ

Daisy_READ read operation of daisy channel memory read operation of upper channel memory

CELLULAR RADIO COMMUNICATION SYSTEM HAVING BASE STATIONS CONSTRUCTED IN THE FORM OF A DAISY CHAIN AND METHOD OF CONTROLLING DATA TRANSMISSION USING THE SYSTEM

BACKGROUND OF THE INVENTION

1. Field of the Invention

The present invention relates to a cellular radio communication system having base stations constructed in the form of a daisy chain and a method of controlling data transmission using the system. In particular, the present invention relates to a cellular radio communication system having base stations constructed in the form of a daisy chain and a method of controlling data transmission using the system whereby data communications with a plurality of base stations as well as data communications among the respective base stations can be performed using a single base station controller and shared transmission lines in a specified area wherein expressways or railroads are constructed, and wherein the traffic amount is relatively small, but the whole service area is relatively large in comparison to a thickly-populated downtown area.

2. Discussion of the Related Art

Generally, cellular radio communication systems have been developed in preferential consideration of downtown areas having relatively a large amount of telephone traffic. Accordingly, the form of each cell has mainly been designed as a star type. At the center of such a star type cell is provided a base station controller which is linked to a plurality of base stations through dedicated trunk lines of the corresponding base station.

However, due to the continuous development of the mobile radio communication techniques, the number of subscribers of the mobile radio communication networks have been continuously increased. Under the circumstances, the subscribers demand that they achieve call communications anywhere in their country or in specified areas. Practically, the call communications between the subscribers of the mobile radio communication networks have been abruptly increased especially during their travels by trains or by taking highway. Accordingly, researches and efforts to extend the whole service area of the radio communication system with a short construction period and an inexpensive maintenance have been continuously made by industrialists of the radio communication system.

However, if the conventional star type cell is applied to the area in which expressways or railroads are constructed, and in which the traffic amount is relatively small, but the whole service area is relatively large in comparison to a thickly-populated downtown area, the service effectiveness is not so good in contrast with the expenses invested in equipment of the communication system.

Considering the above-described circumstances, if a cellular radio communication system is employed, whereby data communications with a plurality of base stations as well as data communications among the respective base stations can be performed using a single base station controller and a single shared transmission line in a specified area wherein expressways or railroads are constructed, and in which the traffic amount is relatively small, but the whole service area is relatively large in comparison to a thickly-populated downtown area, the expenses of equipping and maintaining the communication system as well as the construction period will be greatly reduced.

SUMMARY OF THE INVENTION

Accordingly, the present invention is directed to a cellular radio communication system having base stations constructed in the form of a daisy chain and a method of controlling data transmission using the system that substantially obviates one or more of the problems due to limitations and disadvantages of the related art.

An object of the present invention is to provide a cellular radio communication system having base stations constructed in the form of a daisy chain whereby data communications with a plurality of base stations as well as data communications among the respective base stations can be performed using a single base station controller and shared transmission lines in a specified service area that is relatively large in comparison to a downtown area.

Another object of the present invention is to provide a method of controlling data transmission which can heighten the transmission efficiency of the whole data by arbitrating the output of data produced from its own base station provided in a cellular radio communication system having base stations constructed in the form of a daisy chain and the output of data to be transmitted from a plurality of lower base stations to upper base stations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the cellular radio communication system having base stations constructed in the form of a daisy chain, comprises a base station controller provided in a specified region of a determined service area, and a plurality of base stations linked in series to the base station controller through trunk lines, wherein data communications between the base station controller and each of the base stations and data communications among the base stations are performed through the trunk lines.

It is preferable that each of the base stations provided in the cellular radio communication system according to the present invention has a data transmission control device which comprises a first interface for matching a voltage level of data, which is transmitted from a lower base station through the trunk line, to its own base station, a second interface for matching a voltage level of data, which is transmitted to an upper base station or to the base station controller, to the trunk line, a packet bus for receiving and transmitting input data to an internal processor board provided in its own base station and outputting data generated from its own base station, a lower channel memory for storing the data outputted from the first interface and exchanging data with the packet bus if necessary, a daisy channel memory for storing data identical to that stored in the lower channel memory if the data outputted from the first interface is to be transmitted to the upper base station, an upper channel memory for storing the data generated from its own base station if the data is to be transmitted to the upper base station, and an arbitrator for performing arbitration so that the data stored in the daisy channel memory and/or the upper channel memory is selectively outputted through the trunk line.

In another aspect of the present invention, there is provided a method of controlling data transmission in a cellular radio communication system having a base station controller provided in a determined service area and a plurality of base stations constructed in the form of a daisy chain and linked in series to the base station controller through trunk lines, the method comprising the steps of storing a first data transmitted from a lower base station and a second data to be outputted from its own base station if the data is transmitted from its own base station to an upper base station or to the base station controller, discriminating whether the data to be transmitted to the upper base station or to the base station controller exists at least in one memory provided in its own base station, and performing arbitration so that the respective stored data are selectively outputted in accordance with the frequency of assert signals produced from its own base station if it is discriminated that the data to be transmitted exists at least in one memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
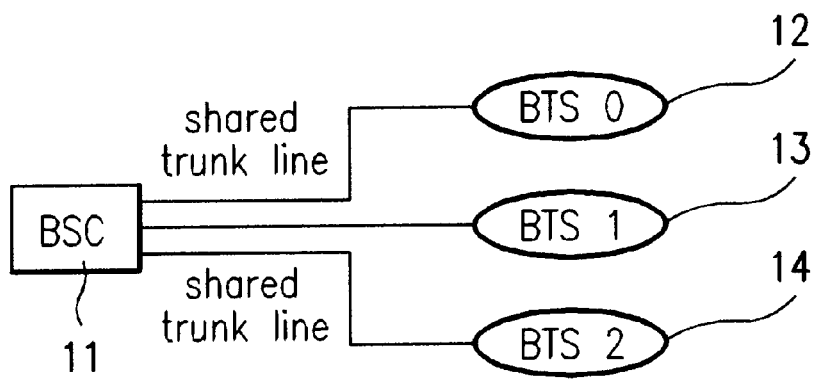
FIG. 1 is a block diagram illustrating base stations linked to a base station controller in a typical star type cellular radio communication system.

FIG. 1 is a block diagram illustrating base stations linked to a base station controller in a typical star type cellular radio communication system.

Referring to FIG. 1, in the conventional star type cellular radio communication system, a cell employed in a specified communication service area is constructed so that a base station controller 11 is provided at the center position of the whole cell, and a plurality of base stations 12 to 14 are linked to the base station controller 11 through trunk lines in a one-to-one manner. Accordingly, the base station controller 11 transmits a call setup demand signal or a release signal to the respective base stations 12 to 14, while the respective base stations 12 to 14 transmit a response signal to the call setup demand signal inputted from the base station controller 11 or a loading request signal.

Since the respective base stations 12 to 14 are linked to the base station controller 11 in the one-to-one manner, communications therebetween can be effected any time. On the contrary, in case of data communication between the respective base stations 12 to 14, it cannot be effected directly, but can be effected by arbitration of the base station controller 11. Accordingly, if a number of subscribers try to perform data transmission simultaneously, such data communication is limited in accordance with the number of subscribers and the capacity of the system.

Also, if the above-described star type cell is constructed in the specified area where expressways or railroads are installed, the actual service effectiveness will be not so good in comparison to the expenses invested in equipment of the communication system.

Figure 2:
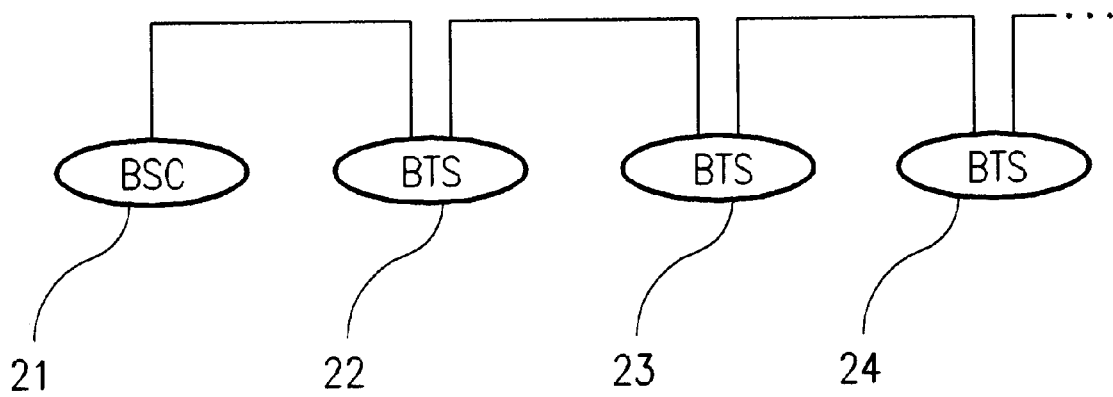
FIG. 2 is a block diagram illustrating the linked state of base stations and a base station controller in the cellular radio communication system according to the present invention.

FIG. 2 is a block diagram illustrating the linked state of base stations and a base station controller in a cellular radio communication system according to the present invention.

Referring to FIG. 2, the cellular radio communication system according to the present invention includes a base station controller 21 provided in a specified service area, and a plurality of base stations 22 to 24 linked in series to the base station controller 21 through shared trunk lines. Here, the base station controller 21 may be positioned anywhere in the service area, but it is preferable that it is located at the uppermost position of a daisy chain.

Figure 3:
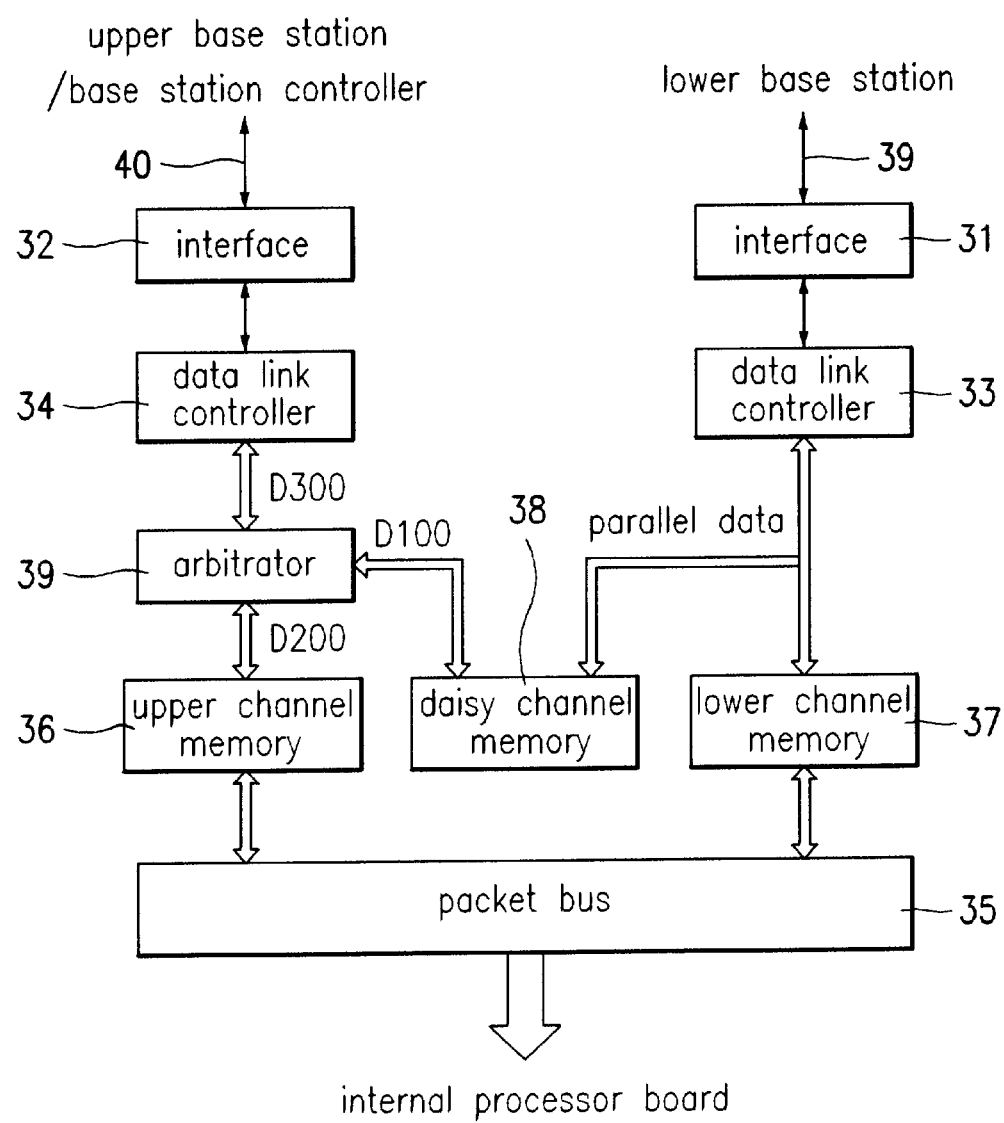
FIG. 3 is a block diagram of the data transmission control device according to the present invention.

Each of the base stations in the cellular radio communication system according to the present invention has a data transmission control device as shown in FIG. 3. This data transmission control device includes an interface 31 for matching a voltage level of data, which is transmitted from a lower base station 24 through the trunk line 39, to its own base station 23, an interface 32 for matching a voltage level of data, which is transmitted to an upper base station 22, to the trunk line, a packet bus 35 for receiving and transmitting input data to an internal processor board (not illustrated) provided in its own base station 23 if required, and receiving data provided from the internal processor board, a lower channel memory 37 for storing the data outputted from the interface 31 and exchanging data with the packet bus 35 if necessary, a high level data link controller (HDLC) 33 for converting a frame format of the data provided from the lower channel memory 37 or the interface 31 into a serial/parallel format to output the format-converted data, a daisy channel memory 38 for storing data identical to that stored in the lower channel memory 37 if the data outputted from the interface 31 is to be transmitted to the upper base station 22, an upper channel memory 36 for storing the data generated from its own base station 23 if the data is to be transmitted to the upper base station 22, an arbitrator 39 for performing arbitration so that the data stored in the daisy channel memory 38 and the upper channel memory 36 are selectively outputted through the trunk line, and a high level data link controller 34 for converting a frame format of the data provided from the arbitrator 39 or the interface 32 into a serial/parallel format to output the format-converted data.

Figure 4:
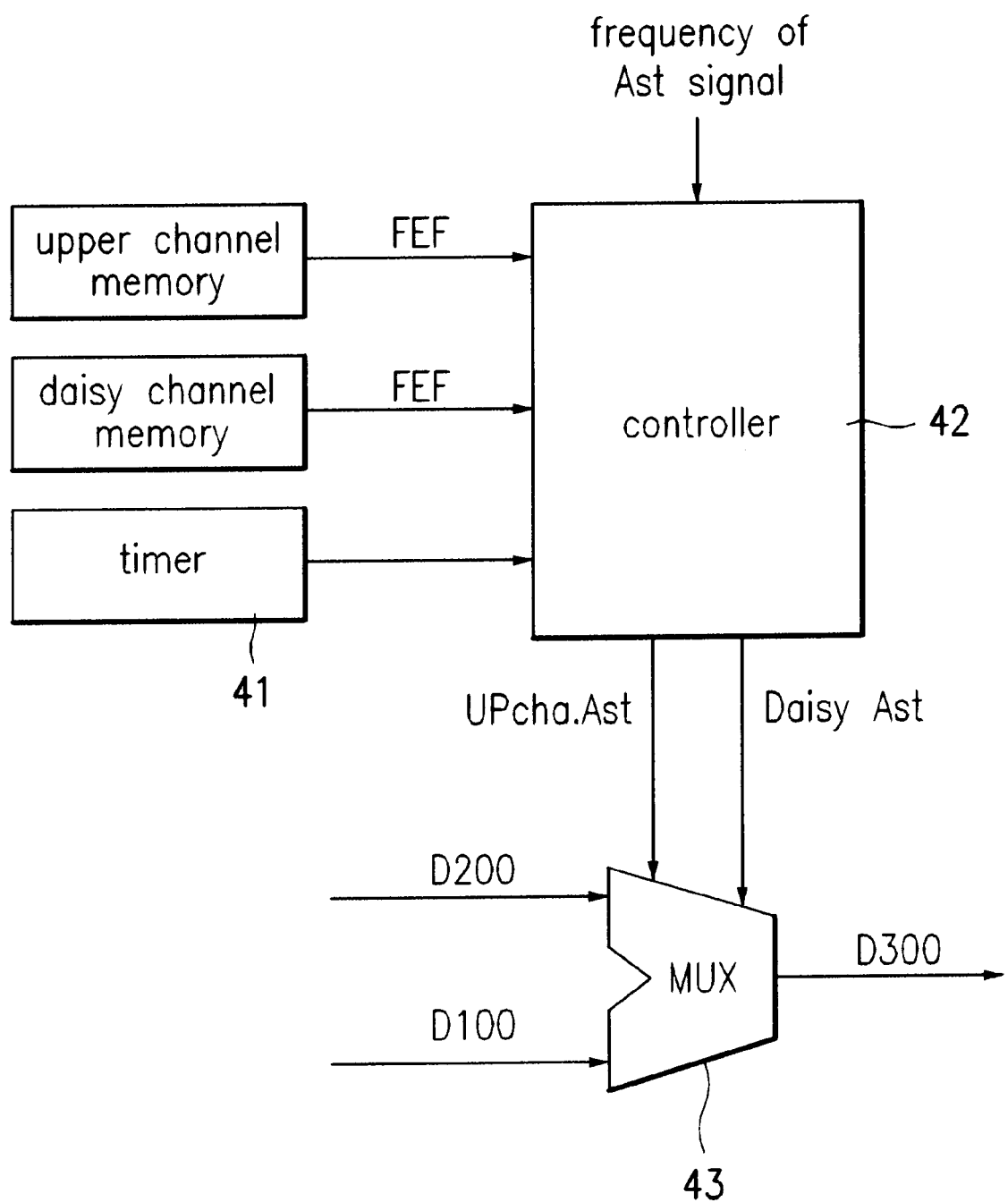
FIG. 4 is a block diagram of the arbitrator in FIG. 3.

Here, as shown in FIG. 4, the arbitrator 39 comprises a timer 41 for generating a reference clock signal, a controller 42 for receiving the reference clock signal from the timer, and outputting a read signal UPCha.Ast/DaisyAst for selectively reading out data from one of the upper channel memory 36 and the daisy channel memory 38 in accordance with the frequency of the assert signals of the memories 36 and 38 if the data to be transmitted is stored in the daisy channel memory 38 and the upper channel memory 36, and a multiplexer 43 for controlling the output of the data stored in the upper channel memory 36 and the daisy channel memory 38 in accordance with the read signal outputted from the controller 42.

The data transmission control operation of the cellular radio communication system having base stations constructed in the form of a daisy chain according to a preferred embodiment of the present invention will be explained with reference to FIGS. 2 to 4.

In the embodiment of the present invention, the base stations 23, 24, and 22 in FIG. 2 are defined as its own base station, the lower base station, and the upper base station, respectively. The number of base stations 22 to 24 may be expanded if required.

In case of transmitting data from its own base station 23 to the upper base station 22, the data stored in the base station 23 may be classified into two. One is the data transmitted from the lower base station 24, and the other is the data produced from its own base station 23.

First, the data transmitted from the lower base station 24 through the trunk line 39 is inputted to the interface 31, and the voltage level of the input data is matched to the base station 23 through the interface 31. The data outputted from the interface 31 is in a serial data format, is then converted into a parallel data format by the high level data link controller 33. Thereafter, the data outputted from the high level data link controller 33 is simultaneously stored in the lower channel memory 37 and the daisy channel memory 38.

At this time, if the data transmitted from the lower base station 24 refers to the communication between the two base stations 23 and 24, the data is not stored in the daisy channel memory 38, but is directly stored in the lower channel memory 37. The data stored in the lower channel memory 37 is then transmitted to required internal processor boards through the packet bus 35.

Meanwhile, if the data produced from its own base station 23 is to be transmitted to the upper base station, it is stored in the upper channel memory 36 through the packet bus 35.

If the data produced from its own base station 23 is to be transmitted to the lower base station 24, the data is not stored in the upper channel memory 36, but is directly stored in the lower channel memory 37. The data stored in the lower channel memory 37 is then transmitted to the high level data link controller 33 to be transmitted to the lower base station 24.

As described above, the data to be transmitted to the upper base station 22 may be stored in both the upper channel memory 36 and the daisy channel memory 38, or may be stored in either of them.

The arbitrator 39 identifies the data to be transmitted to the upper base station by checking the state of frame empty flags or frame exist flags of the two memories 36 and 38. If the data is stored in either of the memories, the arbitrator 39 selects the memory in which the data is stored in accordance with the frequency of the respective assert signals produced from its own base station 23 to output the data from the memory.

However, if the data is stored in both the two memories 36 and 38, the arbitrator 39 selects one of the memories 36 and 38 at predetermined intervals in accordance with the frequency of the respective assert signals to output the data from the selected memory.

The operation of the arbitrator 39 will be explained in more detail with reference to FIGS. 4, 5A to 5F.

The timer 41 in the arbitrator 39 produces the reference clock signal to the controller 42. The controller 42, as shown in FIGS. 5C and 5D, checks the state of the frame empty flags or the frame exist flags of the daisy chain memory 38 and the upper channel memory 36. In other words, the controller 42 identifies if the number of the frame empty flags or the frame exist flags of the daisy chain memory 38 and the upper channel memory 36 is more than/less than a predetermined number.

Figure 5A:
FIGS. 5A to 5F are timing diagrams explaining the operation of the arbitrator in FIG. 3.
Figure 5B:
Figure 5C:
Figure 5D:
Figure 5E:
Figure 5F:
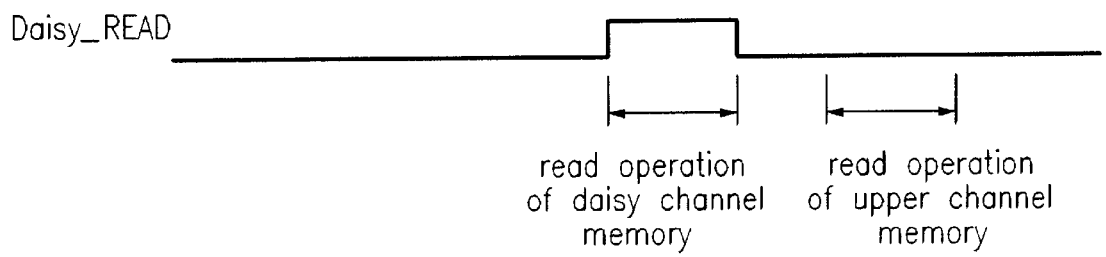

At this time, the controller 42, as shown in FIGS. 5A and 5B, outputs to the multiplexer 43 the channel read signals UPCha.Ast/DaisyAst (See FIGS. 5E and 5F.) for selectively reading one of the data produced from the lower base station 24 and the data produced from its own base station 23 in accordance with the frequency of the assert signals provided from its own base station 23.

In the embodiment of the present invention, the frequency of the assert signals is determined in two methods.

One method is to fix the frequency of the assert signals in accordance with the number of the lower base stations under the condition that the amounts of data of the respective base stations 22 to 24 are equal to one another.

If lower base stations of n−1 are linked to its own base station, the frequency of the assert signals for reading the data from the lower base station and that for reading the data of its own base station are determined at the rate of (n−1) to 1 in the event that the frequency of the whole assert signals is n. This method does not consider the traffics of the respective base stations, but fixedly determines the frequency in accordance with the number of base stations. Accordingly, this method has the advantage of easy implementation and easy maintenance, but has the defect of occurrence of queuing delay in case that the traffic deviations among the respective base stations are severe.

The other method overcomes the problem of the above-described method. This method is to get the statistics of the traffics of the respective base stations 21 to 24 by means of the base station controller 21 and provides the variable frequency of the assert signals to the respective base stations. According to this method, since the frequency of the assert signals is varied in accordance with the traffics of the respective base stations, the assert signals S-Ast/DaisyAst for reading the data are outputted in accordance with the weighted values of the data stored in the daisy channel memory 38 and the upper channel memory 36.

Accordingly, the arbitrator 39 performs arbitration so that either the data D100 transmitted from the lower base station 24 or the data D200 produced from its own base station 23 is selectively outputted.

Meanwhile, if it is checked by the arbitrator 39 that the data is stored in either of the daisy chain memory 38 and the upper channel memory 36, the arbitrator 39 operates in the same manner as the case that the data is stored in both the daisy chain memory 38 and the upper channel memory 36 as described above. However, in this case, the actually outputted data is the one stored in one memory.

Accordingly, the arbitrator 39 performs arbitration so that either the data D100 transmitted from the lower base station 24 or the data D200 produced from its own base station 23 is continuously outputted.

The data outputted through the arbitrator 39 is in the parallel format, and is then converted into the serial format by the high level data link controller 34. Thereafter, the serial data outputted from the high level data link controller 34 passes through the interface 32 with its voltage level matched to its own base station, and then transmitted to the upper base station 22. In the embodiment, the base station 22 is first linked to the base station controller 21, and thus the data from the base station 22 is transmitted to the base station controller 21.

Meanwhile, if the data from the base station 23 is to be transmitted to the lower base station 24, the data to be transmitted is stored in the lower channel memory 37 through the packet bus 35, and then transmitted to the lower base station 24 through the trunk lines, after passing through the high level data link controller 33 and the interface 31.

As described above, according to the present invention, data communications with a plurality of base stations and data communications between the respective base stations can be achieved using a single base station controller and shared transmission lines in a specified service area where expressways or railroads are constructed. Also, in transmitting the data produced from its own base station and the data produced from the lower base station to the upper base station, arbitration is performed so that the data is selectively transmitted in accordance with the traffics of the respective base stations.

From the foregoing, it will be apparent that the cellular radio communication system according to the present invention provides the advantages in that it can reduce the expenses of equipping and maintaining the system as well as its construction period since the system can be applied to the service area in which expressways or railroads are constructed and in which the traffic amount is relatively small, but the whole service are is relatively large in comparison to a thickly-populated downtown area. Also, the present invention can heighten the transmission efficiency of the whole data by arbitrating the output of the data from its own base station.

It will be apparent to those skilled in the art that various modifications and variations can be made in the cellular radio communication system having base stations constructed in the form of a daisy chain and a method of controlling data transmission using the system of the present invention without departing from the spirit or scope of the invention. Thus, it is intended that the present invention cover the modifications and variations of this invention provided they come within the scope of the appended claims and their equivalents.

What is claimed is:

1. A cellular radio communication system having base stations constructed in the form of a daisy chain, comprising:
   a plurality of base stations linked in series to a base station controller through trunk lines;
   the base station controller located at an uppermost position in the daisy chain; wherein each of the base stations has a data transmission control device for processing data from a lower base station or its own base station and selectively outputting the processed data to an upper base station or the base station controller through the trunk line, wherein at least one of the data transmission control devices comprises,
   a packet bus that receives and transmits input data to an internal processor board provided in its own base station and outputs data generated from its own base station,
   a lower channel memory that stores the data outputted from the lower base station through the trunk line and exchanges data with the packet bus if necessary,
   a daisy channel memory that stores data identical to that stored in the lower channel memory if the data outputted from the lower base station is to be transmitted to the upper base station,
   an upper channel memory that stores the data generated from its own base station if the data is to be transmitted to the upper base station, and
   an arbitrator that performs arbitration so that the data stored in the daisy channel memory and/or the upper channel memory is selectively outputted through the trunk line.

2. The cellular radio communication system as claimed in claim 1, wherein each of the data transmission control devices comprises:
   a first interface for matching a voltage level of data, which is transmitted from the lower base station through the trunk line, to its own base station; and
   a second interface for matching a voltage level of data, which is transmitted to the upper base station or to the base station controller, to the trunk line.

3. The cellular radio communication system as claimed in claim 2, wherein the data transmission control device further comprises:
   first and second data link controllers, connected between the first interface and the lower channel memory and between the second interface and the arbitrator, respectively, for converting a frame format of the input data into a serial/parallel format to output the format-converted data.

4. The cellular radio communication system as claimed in claim 2, wherein the arbitrator comprises:
   a timer for generating a reference clock signal;
   a controller for receiving the reference clock signal generated from the timer, and outputting a read signal for selectively reading out the data from one of the upper channel memory and the daisy channel memory in accordance with the frequency of the assert signals of the upper channel memory and the daisy channel memory if the data to be transmitted is stored in the daisy channel memory and the upper channel memory; and
   a multiplexer for controlling the output of the data stored in the upper channel memory and the daisy channel memory in accordance with the read signal outputted from the controller.

5. The cellular radio communication system as claimed in claim 2, wherein if the data produced from its own base station is to be transmitted to the lower base station, the data is stored only in the lower channel memory, and then transmitted.

6. A method of controlling data transmission in a cellular radio communication system having a base station controller provided in a determined service area and a plurality of base stations constructed in the form of a daisy chain and linked in series to the base station controller through trunk lines, the method comprising the steps of:
   storing a first data transmitted from a lower base station and a second data to be outputted from its own base station if the data is to be transmitted from its own base station to an upper base station or to the base station controller;
   discriminating whether the data to be transmitted to the upper base station or to the base station controller exists at least in one memory provided in its own base station; and
   performing arbitration so that the respective stored data are selectively outputted in accordance with the frequency of assert signals produced from its own base station if it is discriminated that the data to be transmitted exists at least in one memory.

7. The method of controlling data transmission as claimed in claim 6, further comprising the steps of:
   matching the first data to its own base station before the data storing step; and
   converting a frame format of the data into a parallel format.

8. The method of controlling data transmission as claimed in claim 6, wherein the discriminating step is performed utilizing the state of frame empty flags or frame exist flags identified from the memories for storing the data, respectively.

9. The method of controlling data transmission as claimed in claim 6, wherein the frequency of the assert signals is determined by values preset in accordance with positions of the respective base stations.

10. The method of controlling data transmission as claimed in claim 9, wherein if lower base stations of n−1 are linked to its own base station, the frequency of the assert signals for reading the data from the lower base stations and that for reading the data of its own base station are determined at the rate of (n−1) to 1 in case that the frequency of the whole assert signals is n.

11. The method of controlling data transmission as claimed in claim 6, wherein the frequency of the assert signals is varied in accordance with a traffic amount of the respective base stations constructed in the form of a daisy chain.

12. The method of controlling data transmission as claimed in claim 6, wherein the respective base stations report their own traffic channel information to the base station controller at predetermined intervals, respectively.

13. A cellular radio communication system having base stations constructed in the form of a daisy chain, comprising:
   a base station controller; and
   a plurality of base stations linked in series to the base station controller through a trunk line, wherein each of the base stations has a data transmission control device for processing data from a lower base station or its own base station and selectively outputting the processed data to an upper base station or the base station controller through the trunk line, wherein each of the data transmission control devices comprises:
      a bus for receiving and transmitting input data to an internal processor provided in its own base station and transmitting output data generated from its own base station;
      a first channel memory coupled to the bus that stores first data outputted from the lower base station;
      a second channel memory that stores second data identical to that stored in the first channel memory if the first data is to be transmitted to the upper base station;
      a third channel memory that stores third data generated from its own base station if the third data is to be transmitted to the upper base station; and
      an arbitrator that performs arbitration so that the second and third data stored in the second channel memory and/or the third channel memory is selectively outputted through the trunk line.

14. The cellular radio communication system of claim 13, wherein the arbitrator comprises:
   a timer that generates a reference clock signal;
   a controller that receives the reference clock signal generated from the timer, and outputs a read signal for selectively reading out from one of the third channel memory and the second channel memory in accordance with the frequency of the assert signals of the third channel memory and the second channel memory if the output data to be transmitted is stored in the second channel memory and the third channel memory; and
   a selector that controls the output of the second and third data stored in the second channel memory and the third channel memory in accordance with the read signal outputted from the controller.

\* \* \* \* \*